(12) United States Patent
Iyer

(10) Patent No.: US 9,782,719 B1
(45) Date of Patent: Oct. 10, 2017

(54) SOLVENTS AND METHODS FOR GAS SEPARATION FROM GAS STREAMS

(71) Applicant: NRGTEK, INC., Orange, CA (US)

(72) Inventor: Subramanian Iyer, Orange, CA (US)

(73) Assignee: NRGTEK, INC., Orange, CA (US)

( * ) Notice: Subject to any disclaimer, the term of this patent is extended or adjusted under 35 U.S.C. 154(b) by 0 days.

(21) Appl. No.: 15/271,175

(22) Filed: Sep. 20, 2016

Related U.S. Application Data

(60) Provisional application No. 62/372,762, filed on Aug. 9, 2016.

(51) Int. Cl.
  *B01D 53/14* (2006.01)
  *B01D 53/62* (2006.01)
  *B01D 53/78* (2006.01)
  *B01D 53/96* (2006.01)

(52) U.S. Cl.
  CPC ..... *B01D 53/1493* (2013.01); *B01D 53/1425* (2013.01); *B01D 53/1462* (2013.01); *B01D 53/1481* (2013.01); *B01D 2252/2025* (2013.01); *B01D 2252/2026* (2013.01); *B01D 2252/2041* (2013.01); *B01D 2252/502* (2013.01)

(58) Field of Classification Search
  None
  See application file for complete search history.

(56) References Cited

U.S. PATENT DOCUMENTS

| | | | |
|---|---|---|---|
| 3,403,522 A | 10/1968 | Henry | |
| 4,279,628 A | 7/1981 | Wymer et al. | |
| 4,466,946 A | 8/1984 | Goddin, Jr. et al. | |
| 4,609,384 A | 9/1986 | Ranke et al. | |
| 5,277,884 A | 1/1994 | Shinnar et al. | |
| 6,322,612 B1 | 11/2001 | Sircar et al. | |
| 6,391,205 B1 | 5/2002 | McGinnis | |
| 6,849,184 B1 | 2/2005 | Lampi et al. | |
| 7,314,847 B1 | 1/2008 | Siriwardane | |
| 7,740,689 B2 | 6/2010 | Fradette et al. | |
| 7,955,506 B2 | 6/2011 | Bryan et al. | |
| 8,021,549 B2 | 9/2011 | Kirts | |
| 8,021,553 B2 | 9/2011 | Iyer | |
| 8,083,942 B2 | 12/2011 | Cath et al. | |
| 8,133,307 B2 | 3/2012 | Suzuki | |
| 8,252,091 B2 | 8/2012 | Anand et al. | |

(Continued)

FOREIGN PATENT DOCUMENTS

| EP | 0571997 A1 | 12/1993 | |
|---|---|---|---|
| EP | 2700440 A2 | 2/2014 | |
| WO | WO2015/068160 | * 5/2015 | ........... A61K 31/717 |

*Primary Examiner* — Daniel Berns
(74) *Attorney, Agent, or Firm* — UltimatEdge IP Law Group, P.C.; Dean G. Stathakis; Vito A. Canuso, III

(57) ABSTRACT

A method of removing acid gases from a gaseous stream is provided. The acid gases may include carbon dioxide, hydrogen sulfide and/or sulfur dioxide, by example. Embodiments of the method include mixing an amine-terminated branched polymer solvent with the gaseous stream, resulting in the substantial absorption of at least some of the acid gases. The solvent is an amine-terminated branched PEG, such as by example amine-terminated glycerol ethoxylate, amine-terminated trimethylolpropane ethoxylate, and/or amine-terminated pentaerithritol ethoxylate. Embodiments of the present inventive methods further include regenerating the solvent using electrolysis.

6 Claims, 4 Drawing Sheets

(56) References Cited

U.S. PATENT DOCUMENTS

| | | | |
|---|---|---|---|
| 8,398,757 B2 | 3/2013 | Iijima et al. | |
| 8,551,221 B2 | 10/2013 | Wolfe | |
| 8,647,421 B2 | 2/2014 | Yonekawa | |
| 9,216,917 B2 | 12/2015 | Carmignani et al. | |
| 2009/0130411 A1 | 5/2009 | Chang et al. | |
| 2009/0294366 A1* | 12/2009 | Wright | B01D 53/02 210/683 |
| 2010/0303693 A1 | 12/2010 | Leppin | |
| 2012/0060686 A1* | 3/2012 | Kortunov | B01D 53/1475 95/26 |
| 2012/0085232 A1 | 4/2012 | Sethna et al. | |
| 2012/0211423 A1 | 8/2012 | Kim et al. | |
| 2012/0222442 A1 | 9/2012 | Dieckmann et al. | |
| 2013/0305922 A1 | 11/2013 | Matzger et al. | |

\* cited by examiner

Polyethylene glycol, n= number of EO monomers

Glycerol ethoxylate n = 6-7

Trimethylolpropane ethoxylate

Pentaerythriol ethoxylate a+b+c+d~EO

SOLVENTS AND METHODS FOR GAS SEPARATION FROM GAS STREAMS

CORRESPONDING PATENT APPLICATIONS

The present application takes priority from provisional application Ser. No. 62/372,762 filed Aug. 9, 2016, the entire contents of which are incorporated herein in its entirety by reference.

BACKGROUND

The present invention relates to solvents useful for gas separation of contaminants and/or undesired compounds and elements from gas streams. Carbon dioxide and hydrogen sulfide are two examples of acid gases for which it would be advantageous to separate from gas streams. As contaminant species, acid gases occur in natural gas streams, bio-gas streams, and in other process gas streams in chemical processing and refining operations. Flue gas streams in power production, especially in coal-fired power-plants, also contain a significant amount of carbon dioxide, which has been attributed to be a major cause of global warming and environmental issues. Removal of carbon dioxide from these gas streams is a continuous effort for more efficient and cost-effective processes.

A number of methods are available for removal of acid gases from product gas streams. Some of the more commonly used methods are chemical solvents, physical solvents, membranes, and cryogenic fractionation. Some methods for carbon dioxide capture include the absorption of $CO_2$ in a solvent, either chemical or physical, and subsequent solvent regeneration at elevated temperature and/or reduced pressure. The regeneration of chemical solvents is achieved by the application of heat whereas physical solvents can often be stripped of impurities by reducing the pressure without the application of heat. Physical solvents tend to be favored over chemical solvents when the concentration and partial pressures of acid gases or other impurities are very high. Unlike chemical solvents, physical solvents are non-corrosive, enabling use of lower-cost materials for construction. In general, the economics of $CO_2$ recovery is strongly influenced by the partial pressure of $CO_2$ in the feed gas. At low partial pressures, physical solvents are impractical because the compression of the gas for physical absorption is expensive, and chemical solvents are predominantly used. However, if the gas is available at high pressure, physical solvents are a better choice than chemical solvents.

The concentration of heavy hydrocarbons in the feed gas, like in raw natural gas, also affects the choice of the gas treating solvents. If the concentration of heavy hydrocarbons is high, a physical solvent may not be the best option, due to higher co-absorption of hydrocarbons, particularly pentanes plus. Unlike natural gases where hydrocarbon co-absorption can be a problem for physical solvents, synthesis gases do not contain appreciable quantities of hydrocarbons. This makes physical solvents particularly applicable to synthesis gas treatment, or for cleanup of biogas from landfills or anaerobic digesters in waste-water treatment plants.

The membrane process is applicable for high pressure gas containing high acid gas concentrations. $CO_2$ recovery is accomplished by pressure-driven mass transfer through a permeable membrane where separation is due to the differences in permeation rate of different compounds. The acid gas is recovered at low pressure. A high purity product containing approximately 95% $CO_2$ can be achieved with one or two stages, depending upon feed gas pressure and percent recovery. Economic considerations may dictate additional capital and incremental energy requirements to increase feed pressure and/or utilize two-stage separation with recompression of gas from the first stage.

Chemical Absorption of $CO_2$:

$CO_2$ can be absorbed by many basic sorbents including alkali carbonate, aqueous ammonia, and alkanolamines. Ethanolamines (MEA, DEA, MDEA, DGA, etc.) and hot potassium carbonate are chemical solvent processes which rely on chemical reactions to remove acid gas constituents from sour gas streams. Chemical absorption with amines is one $CO_2$ capture technology actively explored. Amines are useful for $CO_2$ capture because they can increase the solubility of the $CO_2$. The main issue is how the sorbents can be regenerated. The binding between sorbent molecules and $CO_2$ generally is strong and this offers a fast and effective removal of most of $CO_2$ in one stage of absorption. Ideally, a mole of amine can absorb one mole of carbon dioxide or one mole of hydrogen sulfide. However, the strong binding between $CO_2$ and the sorbent molecules is also one of the causes for high energy requirement for solvent regeneration. A second concern is the control of impurities and minor components in the gas stream, including $H_2S$, $SO_2$, oxygen, etc. that may degrade the sorbents. These components have to be removed before the gas enters the absorber, or treated with appropriate measures. Because many sorbents are corrosive, diluted solutions (around 18% for MEA) are typically used.

Chemical solvents, like amines, are usually used as aqueous solutions, either by themselves or as mixtures, and with or without catalysts (like piperazine, PZ). Monoethanolamine (MEA, a primary amine) is used as a 15-20% solution in water, diethanolamine (DEA, a secondary amine) as a 20-30% solution in water, and N-methyl diethanolamine (MDEA, a tertiary amine) as a 30-50% solution in water. If a cost-effective non-thermal pathway can be used to desorb $CO_2$ and regenerate the amines, the extraction of $CO_2$ from low-pressure raw gas streams would be more economically viable.

A major limitation of using MEA as a sorbent is its high heat of absorption for $CO_2$ (72 KJ/mole), equivalent to 18% of the combustion heat of carbon (393.5 KJ/mole)). Secondly, the concentration of MEA used is at 15-20%; this means energy has to be applied to also heat the water solution in the stripper, and possibly evaporate some water in the process. Water is needed for the absorption reaction of $CO_2$, because water enables the formation of bicarbonates, which then preferentially react with the amines exothermically. However, during desorption of the $CO_2$ and thermal regeneration of the amines, the high specific heat of the water carries a considerable energy penalty, and the use of expensive heat exchanger systems to optimize heat balances is needed. The total regeneration energy required is about 900 kcal/kg $CO_2$, or 165 KJ/mole $CO_2$, equivalent to 42% heat from burning a mole of carbon, and 25% of the total combustion energy generated by burning coal. Although the stripper uses low-grade steam, it still causes almost a 20% reduction in power generation for a coal-fired power plant, if all the $CO_2$ in the flue gas has to be removed and sequestered.

Another problem with the use of amines for $CO_2$ capture involves the buildup of impurities and contaminants in the solution which must be removed. For example, small non-charged degradation products, such as low molecular weight amines, are more volatile than the starting amine and can result in emission issues and/or the need for subsequent costly water washing. This is especially the case when some volatile degradation products cannot be removed by ion exchange or other traditional techniques, and are undesirably contained in the exiting gas stream discharged into the atmosphere. Thus, removal or elimination of such unwanted amines, before the gas is discharged from a plant, is desired.

The use of certain solvents, such as an amine attached to a water soluble polymer backbone, can improve the purity of the stream subsequently released into the environment, as well as alleviate the need for some additional processing (e.g., subsequent complex scrubbing techniques and/or water washing), thereby also improving the efficiency of the process. Known amines can be polymerized to obtain a water soluble polymer containing an amino group for use as a solvent. An example of a commercially available water soluble polymerized amine includes polyethyleneimine (PEI). For instance, PEI-150 is a 33% aqueous solution of 10,000 molecular weight polyethyleneimine from Virginia Chemicals. The high molecular weight of PEI unfortunately results in a very high viscosity, leading to higher pumping costs and less efficient gas-liquid mixing.

Suitable amines for attachment to/reaction with a water soluble polymer include primary and secondary amines. A primary amine has one of three hydrogen atoms in ammonia replaced by an organic substituent bound to the nitrogen atom. A secondary amine has two organic substituents bound to the nitrogen atom together with one hydrogen atom. It has been further determined that use of tertiary amines are less suitable than use of primary and secondary amine because, for example, the primary and secondary amines will become tertiary amines upon reaction with the water soluble polymer. Thus, suitable amines for reaction with/attachment to the afore-referenced water soluble polymer having functional groups generally denoted as, e.g., $NH_3$, $NH_2R_1$ and $NHR_1R_2$; where $R_1$ and $R_2$ is selected from, but not limited to —$CH_2CH_2OH$, —$CH_2CO_2H$, —$CH_2CH(OH)CH_3$, —$CH_3$, $CH_2CH_3$ and combinations thereof. Further examples of suitable amines include primary alkyl and secondary alkyl amines in general, methylamine, dimethylamine, ethylamine, diethylamine, monoethanolamine (MEA); diethanolamine (DEA); dimethylamine and secondary cyclic amines such as piperazine and piperidine. Combinations of any of the foregoing could also be employed.

The water soluble polymers to which the afore-referenced amines are attached to include any water soluble polymer having functional groups thereon which are capable of reacting with the amine. For example, the water soluble polymer comprises a functional group such as —$CH_2Cl$, —$CH_2Br$, OH, $HCH(O)CH_2$ (an oxirane group) among other suitable functional groups. A particular example of a suitable water soluble polymer having the desired functional group(s) for attachment to the amine is a chlorinated polymer known as Fibrabon 35® from Diamond Shamrock Chemical Company. Another suitable example includes polyvinyl alcohol (PVA), among others.

Diglycol amine (DGA) can be used at 40% concentration, and thus has twice as much $CO_2$ loading capacity as MEA (currently used at 18%). Several sterically hindered amines have been examined and it is found that some hindered amines can reduce the heat of regeneration by 20%. Sterically hindered amines use geometrical effect to weaken the binding between the $CO_2$ and amine molecules.

Physical Absorption of $CO_2$:

In physical absorption, the $CO_2$ gas molecules get dissolved in a liquid solvent, and no chemical reaction takes place. The binding between the $CO_2$ molecules and solvent molecules, being either Van der Waals type or electrostatic, is weaker than that of chemical bonds in chemi-absorption. The amount of gas absorbed is linearly proportional to its partial pressure (Dalton's and Henry's laws). Physical solvents such as DEPG, Dimethyl Ether of Polyethylene Glycol (Selexol or Gensorb 1753, NMP, N-Methyl-2-Pyrrolidone (Purisol), Methanol (Rectisol), and Propylene Carbonate (Fluor Solvent) are becoming increasingly popular as gas treating solvents, especially for coal gasification applications. The desorption can be achieved either by lowering pressure as in pressure swing absorption (PSA), or raising the temperature as in temperature swing absorption (TSA). Physical absorption has been used in synthesis gas production processes to separate $CO_2$ from hydrogen and CO. These processes include: Rectisol that uses methanol as solvent, Selexol that uses dimethyl ether of polyethylene glycol (DEPG), Sepasolv that uses n-oligoethylene glycol methyl isopropyl ethers, MPE), Purisol that uses N-methyl-2-pyrrolidone, NMP), and Gaselan that uses N-methylcaprolactam (NMC).

Physical solvents tend to be favored over chemical solvents when the pressure and concentration of acid gases or other impurities is very high in the raw gas inlet, and other hydrocarbons are not present, which could also preferentially dissolve in the solvent. In addition, physical solvents can usually be stripped of impurities by reducing the pressure without the addition of heat. Physical solvents such as methanol, NMP (normal methyl pyrolidinone) [U.S. Pat. No. 3,103,411 and U.S. Pat. No. 4,208,382], Selexol, propylene carbonate [U.S. Pat. No. 2,926,751] and others are widely used for the removal of $CO_2$ and $H_2S$ from gases such as natural gas and syngas from coal gasification.

However, physical solvents that can approach the $CO_2$ absorption capacity of chemical solvents need to be developed. In a state-of-the-art carbon dioxide absorption process described in literature, using MEA as the solvent, the concentration of MEA in solution was 0.3 g/g. This gives a typical concentration of carbon dioxide in the MEA solution, as calculated, at 43.8 g/l, using a solution density of 1.013 kg/l, and showing a typical carbon dioxide uptake of 0.2 mol/mol. It also has to be taken into account that the typical uptake for MEA solutions is still relatively inefficient and below the maximum uptake concentration, which can theoretically be five times as high, corresponding to 1 mol carbon dioxide per mol MEA, as would be obtained in a stoichiometric reaction. This would result in a maximum concentration of 219 g/l, which is more than 10 times the maximum concentration reached in physical solvents. In reality, such high uptake values in MEA are not achieved, especially since the presence of water is needed for $CO_2$ absorption by the amines, and thus, the amines have to be an aqueous solution. In addition, the regeneration energy would be very high, as the carbamates formed would need to be broken down to regenerate the solvent by releasing the absorbed $CO_2$.

A mixture of low volatility $CO_2$-philic oligomers known as poly(ethylene glycol) di-methyl ether, DEPG, is the current solvent of choice in the $CO_2$ capture process. Known as Selexol, it is a commercial mixture of poly(ethylene glycol) dimethyl ethers with optimised properties. Poly(dimethylsiloxane), PDMS, and poly(propylene glycol) di-methyl ether, PPGDME, are potentially better solvents, compared to DEPG, in this process due to their limited miscibility or immiscibility with water, a constituent in the natural gas, bio-gas gas or flue streams, but their high viscosity is an issue, an important property for gas transport in and out of the liquid phase in the physical solvents. Other solvents currently used for physical absorption of carbon dioxide are, for example, methanol and sulfolane. Ionic liquids have been suggested as alternative physical solvents for carbon dioxide absorption due to their extremely low vapor pressures. Various ionic liquids were found to absorb $CO_2$ with high selectivity over $N_2$. Polymers of ionic liquids have also been reported to have high $CO_2$ absorption capacity and selectivity over $N_2$, with fast and completely reversible absorption. However, ionic liquids are at present considered to be too expensive for large-scale industrial applications.

There is an urgent need for processes using chemical solvents, without the high energy penalty for solvent regeneration, as well as physical solvents that can match the high $CO_2$ absorption capacity of chemical solvents, with easy regeneration. Alternatively, a new class of solvents that have the high absorption capacity of the alkanolamines, but the low energy regeneration capability of physical solvents is desirable, as described herein.

SUMMARY

Methods of removing acid gases from a gaseous stream are provided. The acid gases may include carbon dioxide, hydrogen sulfide and/or sulfur dioxide, by example. In one application, embodiments of the method comprise mixing an amine-terminated branched polymer solvent with the gaseous stream, resulting in the substantial absorption of at least one of the acid gases. The solvent preferably comprises an amine-terminated branched PEG, and by example could be amine-terminated glycerol ethoxylate, amine-terminated trimethylolpropane ethoxylate, and/or amine-terminated pentaerithritol ethoxylate. Embodiments of the present inventive methods further comprise regenerating the solvent using electrolysis.

In another application, embodiments of the method comprise mixing a branched polyethylene glycol solvent with the gaseous stream, where the branched polyethylene glycol solvent acts to physically absorb substantially at least one of the acid gases. In some embodiment, the solvent comprises glycerol ethoxylate. In other embodiments, the solvent comprises trimethylolpropane ethoxylate. In yet other embodiments, the solvent comprises pentaerithritol ethoxylate.

BRIEF DESCRIPTION OF THE FIGURES

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF CERTAIN EMBODIMENTS

Figure 1:
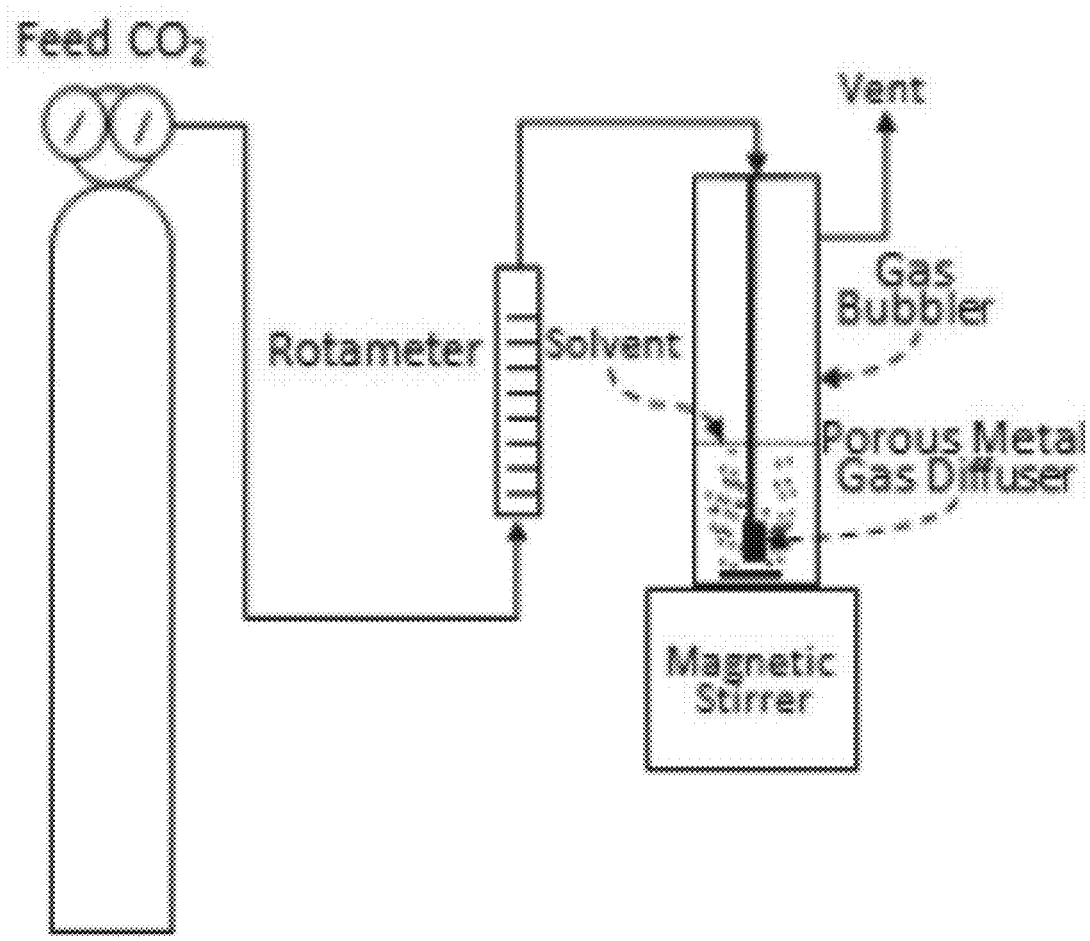
FIG. 1 shows a schematic process of testing absorption of $CO_2$ employed herein for assessing $CO_2$ absorption of solvent compounds.

Embodiments of the present invention comprise systems and methods for both chemical and physical absorption of $CO_2$ from gases, at both high and ambient pressures and for a wide range of acid gas concentration in the incoming raw gas flow. In one embodiment of the present invention, amines are employed to chemically react with incoming raw gas (with $CO_2$ and other undesirable acid gases) to form ionic carbonates and bicarbonates. For example, monoethanolamine (MEA) absorbs $CO_2$ by reacting with it in the presence of water to form $MEAH^+.HCO_3^-$. Similar reactions can occur with diethanolamine (DEA), N-methyl diethanolamine (MDEA) and diglycolamine (DGA). Instead of using conventional thermal processes (typically heating to 120° C.) to desorb the $CO_2$ and regenerate the amines, however, certain embodiments of the present invention use electrolysis for doing so at ambient conditions, and with low energy. In one application, the electrolysis process comprises the following reactions:

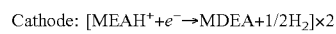
Cathode: $[MEAH^+ + e^- \rightarrow MDEA + 1/2H_2] \times 2$

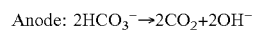
Anode: $2HCO_3^- \rightarrow 2CO_2 + 2OH^-$

$2OH^- \rightarrow H_2O + 1/2O_2 + 2e^-$

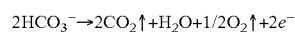
$2HCO_3^- \rightarrow 2CO_2\uparrow + H_2O + 1/2O_2\uparrow + 2e^-$

Overall reaction: $2MEAH^+ + 2HCO_3^- \rightarrow 2MEA + 2CO_2\uparrow + H_2\uparrow + H_2O + 1/2O_2\uparrow$ Only electrical energy is consumed in the regeneration process, and is dependent on the amount of $CO_2$ absorbed by the amine, as predicted by Faraday's Laws. The presence of water can be helpful for the electrolytic regeneration reaction, maintaining ionic conductivity in the solution. In one specific application, the expected voltage for each cell is expected to be around 1.5 VDC, due to the low polarization losses in the cell. At a 90% coulombic efficiency, 45 watt-hours can desorb 22.4 liters of $CO_2$ at standard conditions, or 1 kWh can desorb 497.78 liters of $CO_2$. Conversely, only around 2 kWh of energy will be consumed for desorbing 1 cubic meter (1,000 liters) of $CO_2$ under standard conditions. Even assuming the price of electricity at $0.08/kWh, it would cost only $0.16 to desorb a cubic meter of $CO_2$ from the amine-based solution by using electrochemical pathways. The cell architecture would be fairly simple, without any need of expensive membranes or electrodes, like Nafion™ or titanium anodes/cathodes that are commonly used in brine electrolysis.

In another example of acid gas removal contemplated by the present invention, hydrogen sulfide ($H_2S$) can also be absorbed by amine-based scrubbing agents, with a similar reaction forming amine sulfides. Thus, for example, MEA combines with hydrogen sulfide, $H_2S$, to form MEAH+.HS— salts. The amine can be regenerated by a similar electrochemical route.

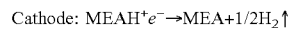
Cathode: $MEAH^+ e^- \rightarrow MEA + 1/2H_2\uparrow$

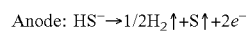
Anode: $HS^- \rightarrow 1/2H_2\uparrow + S\uparrow + 2e^-$

Overall reaction: $MEAH^+ + HS^- \rightarrow MEA + H_2\uparrow + S\downarrow$ Embodiments of the present invention are advantageous over thermal regeneration of amines because the $H_2S$ has to be sequestered or converted into other chemicals by various chemical processes, and because, during thermal desorption, breakdown of the amines by various side reactions is a major issue, and thus, after regeneration, it is common to absorb the unwanted products by absorption in activated charcoal.

Some embodiments of the present invention comprise the physical absorption of $CO_2$ using branched polymers. In one specific application, the solvent comprises a branched polyethylene glycol (PEG). The ethylene oxide (EO) monomer in a polyethylene glycol facilitates hydrogen bonding with water molecules. Although $CO_2$ is a non-polar molecule, it can act as a Lewis acid or a Lewis base and can participate in hydrogen bonding. Thus, the acid-base reactions of the acidic carbon dioxide with the electron-rich ether oxygen in the PEG molecule enables high solubility of $CO_2$ in PEGs. The terminal [—OH] groups in the PEGs also have an affinity for carbon dioxide molecules, resulting in improved electron interaction with the bonds in the carbon dioxide molecule. If both the above interactions, namely the electron-rich ether oxygen in the PEG molecule, and the terminal [—OH] groups at the end of the PEG molecules, result in higher carbon dioxide solubility, PEGs would show higher absorption capacity than the physical solvents like polyethylene glycol dimethyl ethers (which are end-capped with methyl groups, instead of the —OH group in PEGs) used by industry. Also, the greater the number of EO monomers in the PEGs, the greater would be the $CO_2$ absorption. Thus, higher chain-length PEGs should show higher $CO_2$ absorption than smaller chain-length PEGs.

One issue with longer chain-length PEGs is the higher viscosity and higher melting points, as the chain length increases. PEG 200 (EO=4), PEG 300 (EO=6-7) and PEG 400 (EO=9) are all liquid at room temperatures, whereas PEG 600 (EO=12-13) is a waxy solid at room temperature, as are the higher molecular weight PEGs. In addition, the higher the viscosity of the solvent, the lesser the gas-liquid interaction during the absorption processes, and the greater the energy expended during desorption. Thus, a practical limit in the PEG chain length prevents use of longer chain-length PEGs for $CO_2$ absorption. Nonetheless, if liquid polymers can be synthesized, containing higher chain-length PEGs, it would be possible to increase $CO_2$ absorption by increasing the number of EO monomers in the solvent.

While the commonly used PEGs are linear in structure, and increase in melting point and viscosity as the chain-length increases, there are other forms of PEGs available, with different geometries, which are termed branched or multi-armed PEGs. Branched PEGs have 3-10 PEG chains emanating from a central core group. Star PEGS have 10 to 100 PEG chains emanating from a central core group, while comb PEGs have multiple PEG chains grafted onto a polymer backbone. Such branched PEGs allow more EO groups in the polymer, while still having lower melting points and viscosity than comparable linear PEGs with the same number of EO monomers. Thus, the use of such PEG geometries can enable higher $CO_2$ absorption, while retaining the practicality of using higher number of EO monomers for $CO_2$ interaction and absorption.

Branched PEGs can be synthesized from glycerol (3 arms), trimethylolpropane (4 arms, though one of the arms has a methyl group), pentaerythriol (4 arms) and other organic compounds. Some simple branched PEGs commercially available are glycerol ethoxylates (GE), trimethylolpropane ethoxylates (TMPE) and pentaerythriol ethoxylates (PEE). Glycerol ethoxylate, with a molecular weight of 1000, has approximately 20 EO groups, but is a liquid at room temperature, and less viscous than PEG 300 (EO=6). Trimethylolpropane ethoxylate, with a MW of 1014, also has 20 EO groups, is liquid at room temperatures, and also less viscous than PEG 300. Other liquid branched ethoxylates include pentaerythriol ethoxylate, MW 270 (EO=3) and pentaerythriol ethoxylate, MW 797 (EO=15). All of these ethoxylates have terminal [—OH] groups, except for the TMP ethoxylates, which have one terminal methyl group replacing one [—OH] group, out of the four available. Branched PEGs also have advantageous properties of steric hindrance, enabling better absorption of gases.

$CO_2$ absorption experiments were performed with several PEG polymers, including both linear and branched polymers, block co-polymers of ethoxylates and propoxylates, as well as polyethylene glycol dimethyl ether (Selexol or PGDME, also referred to as DEPG), to compare $CO_2$ absorption capacity, and ease of desorption. Butyl diglyme (diethylene glycol dibutyl ether) and glycerol were also tested, to assess the effect of —OH groups against terminal methyl or butyl groups, for $CO_2$ absorption tendencies. Table 1 shows the $CO_2$ absorption capacity for the various solvents tested.

Laboratory-scale tests were performed with all these solvents to determine $CO_2$ absorption capacity at ambient conditions. A test apparatus was fabricated that consisted of a $CO_2$ supply (gas cylinder, 99.5% purity $CO_2$), 0-2 SCFH rotameter, clear PVC bubbler and tubing with a porous-metal gas diffuser assembly and magnetic stirrer, as shown in FIG. 1. The experimental procedure consisted of the following steps: Initially, the test solvent (50-ml) was heated up to 100° C. in a separate glass flask to remove any moisture or absorbed gases. The solvent was then placed in a dehumidifier chamber and allowed to cool down. Once at room temperature, the solvent was poured into the gas bubbler and a weight was taken of the empty bubbler, using a Mettler Toledo PG503-S weigh station (accuracy=1 mg), as well as after filling with the test solvent. $CO_2$ was then bubbled from the gas cylinder into the solvent and the sample was weighed after each 30-minute interval, up to three hours, at a flow rate of 0.2 SCFH of $CO_2$, until a constant weight was obtained, indicating attainment of a maximum solubility in the solvent. In most of the tests, it was observed that the maximum $CO_2$ uptake was attained in the first 30 minutes, after which no appreciable weight gains were obtained. The only exception was PEG-PPG 2500 (BASF Pluronic 10R5), where the maximum weight was recorded after two hours. However, to maintain consistency, all tests were continued for the full three hours.

Figure 2:
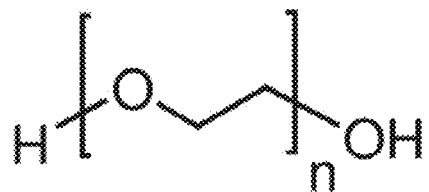
FIG. 2 shows examples of linear and branched PEGs.
Figure 2:
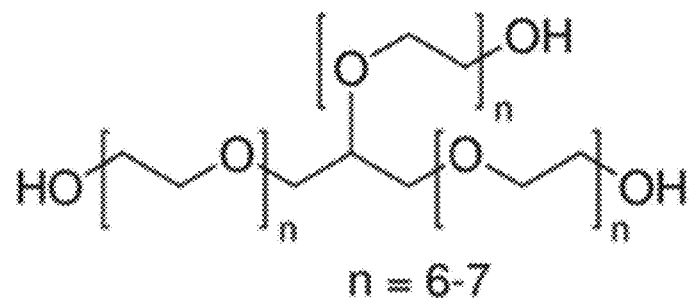
Figure 2:
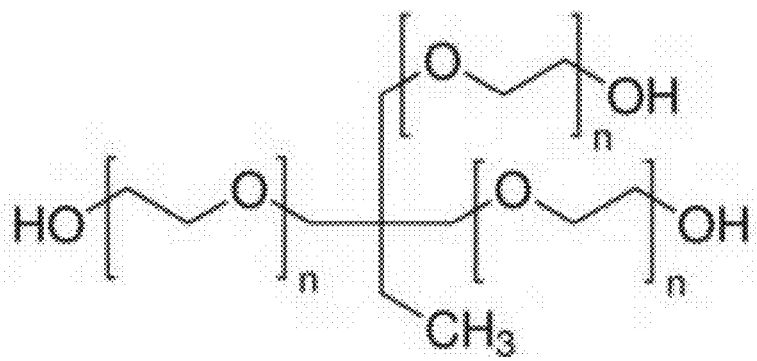
Figure 2:
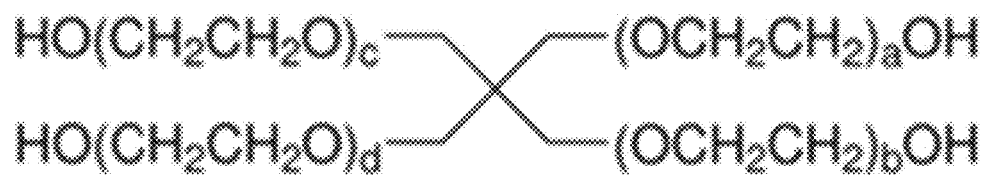

In addition to $CO_2$ absorption testing, $CO_2$ desorption was also tested. The desorption procedure consisted of stirring the $CO_2$-solvent mixture with a magnetic stirrer (FIG. 1), without any heating, for increments of 5 minutes to expel desorbed $CO_2$ and re-weighing the solvent each time. Desorption times ranged from about 5 to 20 minutes for all the solvents tested (as observed by cessation of bubbling from the solvent). Desorption time is important to assess the practicality of the $CO_2$ absorption-desorption system. Comparison of the chemical structures of these newly discovered $CO_2$-philic physical solvents, as compared to conventional PEGs, is shown in FIG. 2.

TABLE 1

Comparison of $CO_2$ absorption capacity by physical solvents

| S. No. | Solvents tested ($CO_2$ stabilized to 1 atm) | Density | $mgCO_2$/g Solvent Absorption | $mgCO_2$/ml Solvent | Desorption Tendency |
|---|---|---|---|---|---|
| 1 | Glycerol | 1.250 | 1.816 | 2.270 | Very slow desorption |
| 2 | Butyl Diglyme (Gensorb 1843) Diethylene glycol dibutyl ether | 0.874 | 4.904 | 4.286 | Slow desorption >10 min |
| 3 | Tetraglyme (Selexol, Gensorb 1753) tetraethylene glycol dimethyl ether | 1.030 | 7.319 | 7.539 | Slow desorption >10 min |

TABLE 1-continued

Comparison of $CO_2$ absorption capacity by physical solvents

| S. No. | Solvents tested ($CO_2$ stabilized to 1 atm) | Density | mgCO$_2$/g Solvent Absorption | mgCO$_2$/ml Solvent | Desorption Tendency |
|---|---|---|---|---|---|
| 4 | Pluronic 10R5PEG-PPG 2500 equimolar EO-PO | 1.300 | 8.279 | 10.763 | Slow desorption, >20 min |
| 5 | PEG 200 (EO = 4) | 1.127 | 11.550 | 13.017 | Slow desorption >10 min |
| 6 | PEG 400 (EO = 8) | 1.250 | 11.538 | 14.423 | Very slow desorption >20 min |
| 7 | Glycerol ethoxylate 1000 (EO = 20) | 1.138 | 12.829 | 14.599 | Fast desorption <5 min |
| 8 | Trimethylolpropane ethoxylate 1014 (EO = 20) | 1.100 | 13.143 | 14.457 | Fast desorption <5 min |

From the above experiments, the tendency to absorb more $CO_2$, based on the PEG chain length, as shown by PEG 200 and PEG 400, can be observed, as compared to tetraglyme (EO=4) or butyl diglyme (EO=2). GE-1000 and TMPE-1014 (EO=20) showed the highest $CO_2$ solubility, while PEG 200 (EO=4) and PEG 400 (EO=8) also indicated appreciable $CO_2$ solubility, well in excess of the capacities of tetraglyme and butyl diglyme, due to their [—OH] end-caps. The desorption experiments also showed faster $CO_2$ desorption for the lower viscosity three-armed ethoxylates (GE-1000 and TMPE-1014), as compared to the much higher viscosity linear PEGs. The extra [—OH] terminal groups in GE-1000 and TMPE-1014 also seem to aid in $CO_2$ absorption tendency, as compared to the glymes and linear PEGs.

Based on these experiments, it is possible to use the above branched PEG solvents by themselves or as mixtures, to maximize $CO_2$ absorption and desorption with minimal energy expenditure. Assuming that the inlet raw gas is at 100 psig (6.8 bar), and the $CO_2$ composition of the raw gas is at 45%, if we use GE-1000 as the $CO_2$-philic solvent, we have an absorption capacity of 39.255 mg $CO_2$/g of solvent, comparable to the ethanolamines in absorption capacity (43.8 mg $CO_2$/g for MEA, as reported in literature), but much easier to desorb, without the associated energy penalties for amines. For TMPE-1014, the absorption numbers are 40.216 mg $CO_2$/g of solvent. Similar, but much higher, characteristics of absorption are also expected for $H_2S$, due to its more acidic nature than $CO_2$, and its increased hydrogen bonding to the EO monomers in these polymerized glycols. Another branched ethoxylate, pentaerierythriol ethoxylate, with four arms, is also suitable for high physical absorption capacity for carbon dioxide and other acid gases.

Given the propensity for $CO_2$ absorption of the EO monomers in the physical solvents described above, as well as the superior absorption characteristics of amine-based solvents for $CO_2$ and $H_2S$, a new class of solvents, based on aminated branched polyethylene glycols, is postulated herein. Such a solvent consists of a branched polyethylene glycol, the ends of which have amine molecules attached, instead of [—OH] molecules. The EO monomers are capable of physically absorbing acid gases like $CO_2$ or $H_2S$, the branched nature of the polymer keeps the solvent liquid and with low viscosity, while maximizing the number of EO monomers for acid gas molecular absorption, and the end-capping with amine molecules also enables chemical absorption of the acid gas molecules in a mole-to-mole ratio. The entire structure of the branched polyethylene glycol amine molecule is rendered water-soluble, due to both the large number of EO monomers and the amine ends. The amine terminations at the branched ends of the polymer render the polymer to behave like a primary amine, with increased absorption capacity of acid gases over conventional primary, secondary and tertiary amines.

For a higher absorption capacity for acid gases like $CO_2$ and $H_2S$, it is proposed to use an amine-terminated branched polyethylene glycol, having amine molecules at its ends, for acid gas absorption. The amine ends act as a chemical absorbent, and with branched molecules, more acid gases per mole of solvent can be absorbed chemically by the increased number of amine molecules terminating the branches of the solvent molecule. Thus, a 3-armed molecule, with three amine molecules, can chemically absorb three acid gas molecules, compared to a single amine in conventional alkanolamines, which can absorb a single acid gas molecule per mole. If the 3-armed molecule is, in addition to its amine-terminated ends, a 3-armed PEG, like an amine-terminated glycerol ethoxylate, an amine-terminated trimethylolpropane ethoxylate, and/or a 4-armed molecule like an amine-terminated pentaerythriol ethoxylate, every EO monomer in the PEG also can absorb its equivalent proportion of acid gas molecules by physical absorption. Other branched PEGs with amine terminated ends can also be used for acid gas absorption, with higher capacities, compared to traditional physical solvents or conventional amine-based chemical solvents. Such a combination of chemical and physical absorption can maximize the absorption capacity of the solvent for acid gases. Regeneration of the solvent is easily facilitated by a combination of electrochemical processes (for $CO_2$ removal from the amine ends) as described earlier, or thermal processes, and physical processes (like pressure swings, inert gas purging or vacuum processes for $CO_2$ removal and regeneration of the physical component of the solvent).

Figure 3:
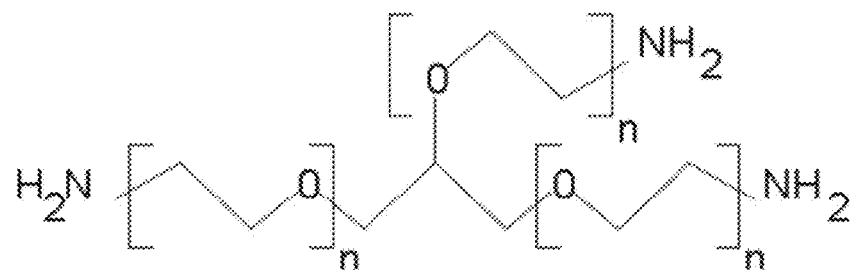
FIG. 3 shows an amine-terminated glycerol ethoxylate compound.
Figure 4:
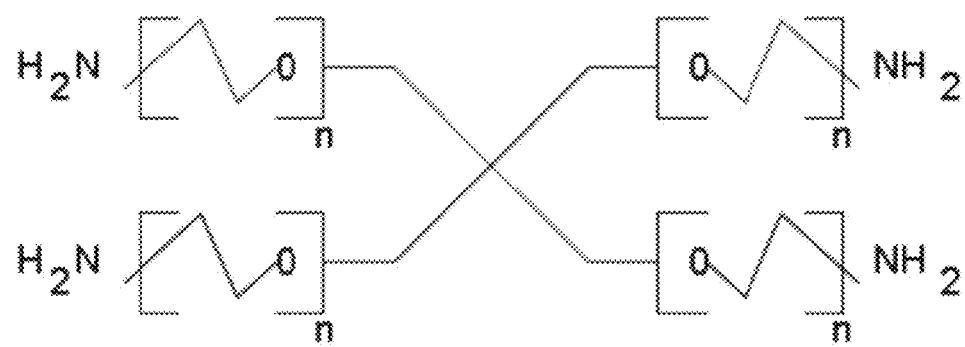
FIG. 4 shows an amine-terminated pentaerithritol ethoxylate compound.
Figure 5:
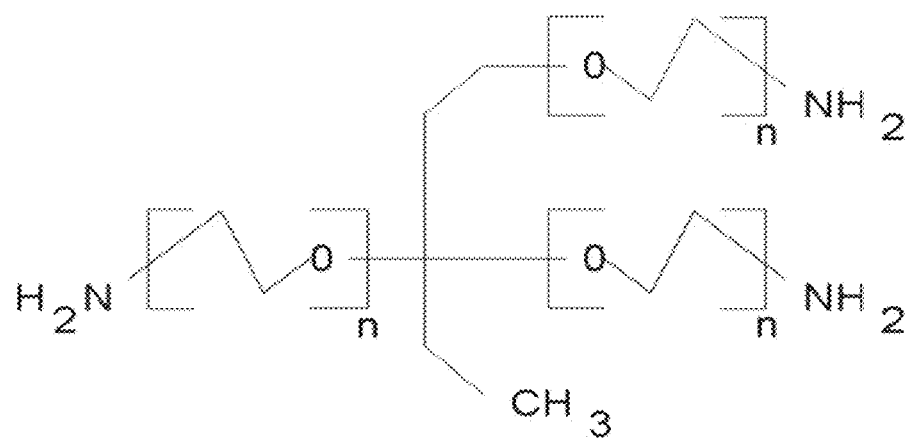
FIG. 5 shows an amine-terminated trimethylolpropane ethoxylate compound.

An amine-terminated, branched polyethylene glycol would thus have maximized absorption capacity for acid gases like $CO_2$ and $H_2S$, while minimizing the energy expended in regeneration of the solvent. FIG. 3 shows the example of a glycerol ethoxylate with amine-terminated ends, where 'n' denotes the number of EO monomers. Similar solvents can be made with pentaerythriol ethoxylates and trimethylolpropane ethoxylates, each with amine-terminated ends, as shown in FIGS. 4 and 5, respectively, for example.

The synthesis of such amine-terminated branched ethoxylates may be as follows: glycerol ethoxylate is reacted with diethylene triamine (DETA) in the presence of acid catalyst at 95-100 Deg C in an inert atmosphere. The DETA quantity can be varied depending on requirements, with the maximum amount being 3.3 moles to 1 mole of Glycerol Ethoxylate. Other amines can be used, instead of DETA. DETA is preferred as this gives greater stability to the amine functionality. Amine-terminated glycerol ethoxylate and pentaerithritol ethoxylates were synthesized in the above manner and tested for $CO_2$ absorption capacities.

The absorption capacity of such a molecule would be at least around 3-10 times the capacity of commonly used amines (MEA, DEA and MDEA), and around 200-300 mg $CO_2$/g solvent, if not higher. The solvent can be easily regenerated by a mix of pressure swing desorption and electrochemical processes for continued use for acid gas removal from raw gas sources. In addition, such a hybrid solvent can function in both low-pressure and high-pressure environments, and at low or high concentrations of $CO_2$ and other acid gases, since it is a hybrid of both chemical and physical solvents, based on its molecular structure.

The absorption capacity for $CO_2$ were tested in the apparatus shown in FIG. 1, for both the synthesized molecules, glycerol ethoxylate (amine-terminated), having a MW of 1,000 for the precursor molecule of glycerol ethoxylate, and pentaerythritol ethoxylate (amine-terminated), having a MW of 797 for the precursor molecule of pentaerythritol ethoxylate. Various other molecular weights of the precursor molecules can also be used for synthesis of these amine-terminated branched polymers, as well as other branched ethoxylates. The results were as follows: the amine-terminated glycerol ethoxylate (MW 1000) exhibited an absorption capacity for $CO_2$, of 196.560 mg $CO_2$/g of solvent. The amine-terminated pentaerythritol ethoxylate (MW 797) showed an even better absorption capacity for $CO_2$, of 250.067 mg $CO_2$/g of solvent. Both solvents were used as a 50% solution in water during testing.

In comparison, monoethanolamine (MEA), a commercially available solvent for $CO_2$ absorption, used in industrial practice as a 20% solution in water, exhibits only 43.8 mg $CO_2$/g of solvent, as reported in literature (R. Notz, A. Asprion, I. Clausen and H. Hasse, Chem. Eng. Res. Des., 2007, 85(A4), 510-515 and A. B. Rao and E. S. Rubin, Environ. Sci. Technol., 2002, 36, 4467-4475). This is equivalent to absorption of 0.2 moles $CO_2$ per mole of solvent. Even if the theoretical capacity of 1 mole of $CO_2$ per mole of solvent is absorbed, under ideal conditions, the maximum capacity computes to 219 mg $CO_2$/g of solvent (MEA). Other studies have shown that MEA has a higher $CO_2$ absorption capacity over DEA, which in turn is higher than the absorption capacity of MDEA for $CO_2$.

Thus, the synthesized amine-terminated branched polymers exhibit higher capacities for acid gas absorption over the traditional amines used in industry, resulting in absorption of multiple gas moles per mole of solvent. Traditional amines can at the maximum absorb only 1 mole of gas per mole of solvent. The use of higher absorption capacity solvents, especially if they can also be used at higher concentrations in water, enables more cost-effective acid gas scrubbing, lower column heights and faster kinetics of absorption, as well as lower thermal energy consumption during the desorption process. An additional physical phenomenon was discovered during the absorption of $CO_2$ by aqueous solutions of these amine-terminated branched polymers. Before the absorption of carbon dioxide gas was performed, these polymers were completely soluble in water. However, after absorption of $CO_2$, the aqueous polymer solution formed a two-phase mixture, clearly separated from each other—an amine-rich phase and a water-rich phase, in roughly the same proportions used for the original water-polymer mixtures before acid gas absorption. Both the amine-terminated glycerol ethoxylate and the amine-terminated pentaerythritol ethoxylate exhibited the same phenomena for complete water solubility before $CO_2$ absorption and insolubility after $CO_2$ absorption.

The above phenomena of phase separation after gas absorption has important implications for practical use of these chemicals, and major advantages in energy consumption for regeneration of these solvents, in comparison to traditional amines like MEA, DEA and MDEA used for acid gas absorption. MEA is used as a 20-25% solution in water, while DEA is used as a 30-35% solution in water, and MDEA is used as a 50% solution in water. During regeneration of these chemical solvents, typically done at 120-135° C., even the water is vaporized while desorbing the absorbed gas, and at 540 kcal/liter, is a substantial energy penalty for regeneration of the solvent, while also increasing the complexity of the processing and heat exchangers involved.

However, if the amine-terminated branched polymers are used for gas absorption, and phase separate from water after gas absorption, the water-rich portion can be removed and only the polymer-rich portion needs to be heated up to desorb the absorbed acid gas. In comparison to conventional amines, after the water has been separated out by decantation or filtration techniques, desorption of the absorbed gas from these amine-terminated amines, occurs at much lower temperatures of around 60-75° C. After the desorption is complete, the water-rich phase and the rich polymer can be remixed and recycled back to the gas absorption process. Such a system would be much more energy-efficient, saving on operating costs, and also save on capital costs for the system. The high boiling points and very low vapor pressures of these amine-terminated ethoxylates, and their comparative chemical stability also results in less solvent degradation and losses from volatilization.

Figure 6:
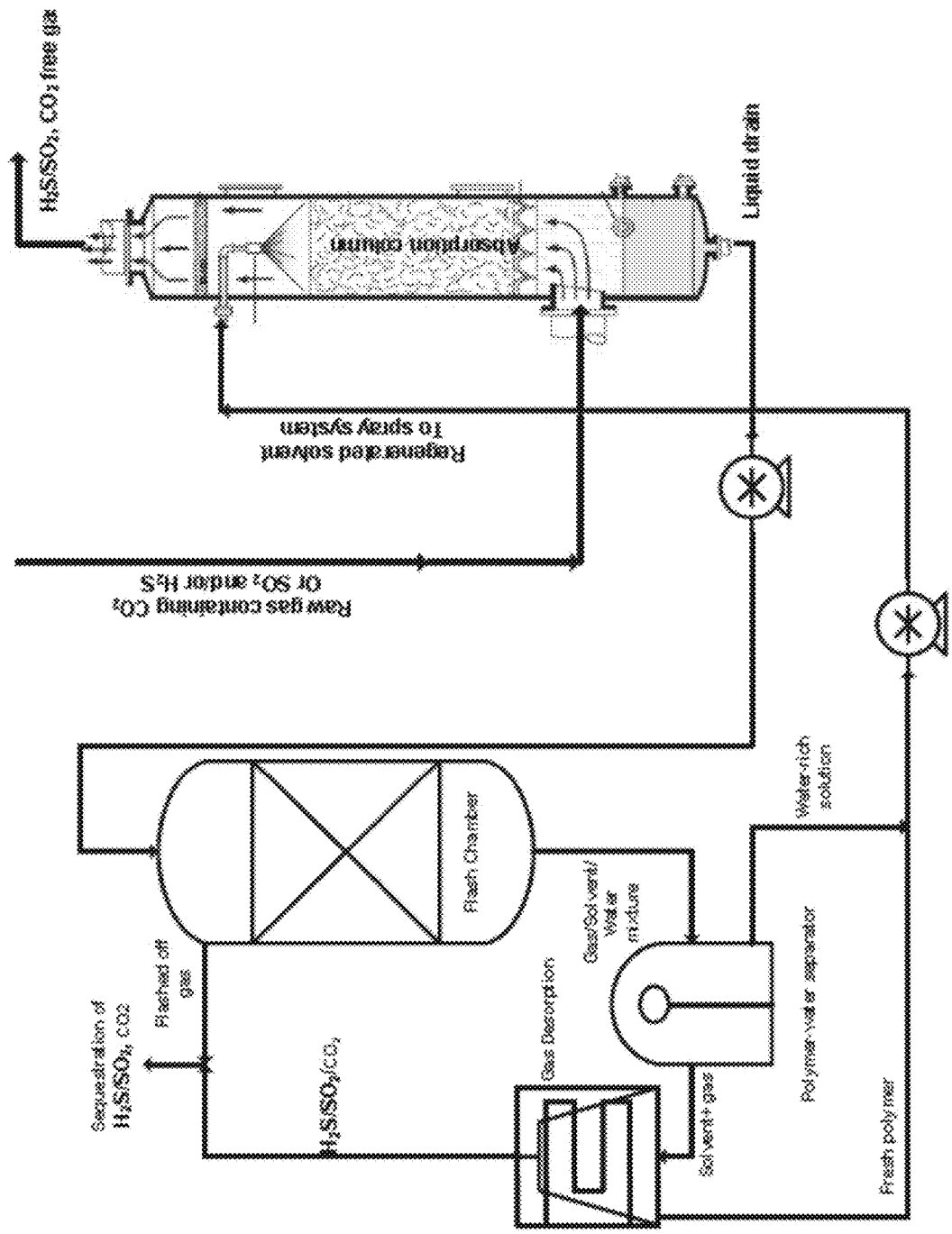
FIG. 6 is a schematic process flow diagram for one embodiment of a gas absorption and solvent regeneration system as described herein.

FIG. 6 shows a simplified process flow diagram for the acid gas removal system, using these amine-terminated branched polymers. Referring to FIG. 6, the acid gas laden stream is directed into a liquid scrubber system, wherein the acid gases are absorbed by the physico-chemical solvent described herein, and clean gas vented out of the scrubber. The solvent, now enriched with the absorbed acid gas, is directed to a flash chamber, wherein any physically absorbed gas species is desorbed by low-pressure swing or vacuum processes. The solvent-water mixture is therein directed to a liquid phase separator system, wherein the two liquid phases are separated by density differentials, using commercially available systems like liquid-liquid coalescers or other suitable apparatus. The solvent-rich stream is therein directed into a heated gas desorption system, wherein the absorbed acid gas is thermally desorbed for sequestration or other uses, and a stream of fresh polymer obtained. The polymer stream is now mixed with the water-rich portion from the liquid-liquid separator, and re-introduced into the scrubber system for more acid gas absorption.

Dependent on the conditions of operation, the new solvents can be used either without dilution in water, or as a solution in water. For low-pressure, low $CO_2$-concentration mixed gas streams, an aqueous solution of the amine-terminated branched ethoxylate, can be used as a chemical solvent, preferably at higher concentrations than commonly used for MEA, DEA or MDEA, and will still exhibit greater than 3 times the $CO_2$ absorption capacity of MEA, DEA and MDEA. For high-pressure, high $CO_2$-concentration mixed gas streams, a pure solution of the amine-terminated branched ethoxylate can be used as a physical solvent, and will still exhibit greater than 3 times the $CO_2$ absorption capacity of Selexol™ (also known as PGDME or DEPG). The proposed solvent can further be tuned to specific applications by varying the number 'n' of the ethoxylate monomers in the amine-terminated branched ethoxylate. Thus, when needed to be used predominantly as a chemical solvent, the number 'n' may be kept small with fewer EO monomers in the molecule, just enough to ensure solubility in water. Conversely, when used predominantly as a physical solvent, the number 'n' may be increased to accommodate larger numbers of EO monomers to optimize $CO_2$ absorption capacity, while maintaining liquid fluidity and low viscosity.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method of removing acid gases from a gaseous stream, the method comprising mixing an amine-terminated branched PEG polymer solvent with the gaseous stream.

2. The method of claim 1, wherein the solvent comprises amine-terminated glycerol ethoxylate.

3. The method of claim 1, wherein the solvent comprises amine-terminated trimethylolpropane ethoxylate.

4. The method of claim 1, wherein the solvent comprises amine-terminated pentaerithritol ethoxylate.

5. The method of claim 1, further comprising regenerating the solvent using electrolysis.

6. The method of claim 1, wherein the acid gas comprises carbon dioxide.

* * * * *